United States Patent [19]

Nakano et al.

[11] Patent Number: 4,597,718
[45] Date of Patent: Jul. 1, 1986

[54] HYDRAULIC FLUID SUPPLY SYSTEM WITH VARIABLE PUMP-DISPLACEMENT ARRANGEMENT

[75] Inventors: Hiromichi Nakano; Hideaki Sasaya; Mitsuo Inagaki, all of Okazaki, Japan

[73] Assignee: Nippon Soken, Inc., Nishio, Japan

[21] Appl. No.: 741,582

[22] Filed: Jun. 5, 1985

[30] Foreign Application Priority Data

Jun. 6, 1984 [JP] Japan .................. 59-116830

[51] Int. Cl.$^4$ .............................................. F04B 49/08
[52] U.S. Cl. .................... 417/300; 417/282; 417/304; 417/308; 417/310
[58] Field of Search ............... 417/282, 293, 300, 302, 417/304, 308, 310

[56] References Cited

U.S. PATENT DOCUMENTS

| | | | |
|---|---|---|---|
| 3,295,752 | 1/1967 | Bellmer | 417/310 |
| 4,047,846 | 9/1977 | Komamura et al. | 417/300 |
| 4,452,571 | 6/1984 | Koda et al. | 417/293 X |

FOREIGN PATENT DOCUMENTS

57-116910 7/1982 Japan .
8303581 10/1983 World Int. Prop. O. .......... 417/293

Primary Examiner—Richard E. Gluck
Attorney, Agent, or Firm—Cushman, Darby & Cushman

[57] ABSTRACT

Hydraulic fluid supply system for supplying high pressure hydraulic fluid to power actuators for power steering systems includes a pumping mechanism having independent pumping chambers adapted to discharge fluid to a supply line leading to the power actuator. The supply line contains a variable orifice and a flow control valve responsive to the pressure difference generated by the variable orifice. The pumping chambers include at least first and second pumping chambers connected to first and second feed lines. A switching valve operatively interconnected to the variable orifice and actuated by an electrically operable drive mechanism selectively connects the second feed line to the supply line or to the first feed line. When the drive mechanism shifts the switching valve so that the second feed line leading to the second pumping chamber is switched from the first feed line to communicate with the supply line, a part of the high pressure fluid flowing through the fluid line is returned to the second pumping chamber by bypassing the power actuator thereby disabling the second pumping chamber and reducing the flow rate of the fluid flowing to the power actuator. Disablement of the second pumping chamber during "drooping" reduces the effective overall displacement capacity of the pumping mechanism thereby saving a considerable amount of power. The system may be electronically controlled depending on various operational conditions of the vehicle and the like.

9 Claims, 5 Drawing Figures

HYDRAULIC FLUID SUPPLY SYSTEM WITH VARIABLE PUMP-DISPLACEMENT ARRANGEMENT

BACKGROUND OF THE INVENTION (1) Field of the Invention

The present invention relates to a hydraulic fluid supply system for supplying a hydraulic fluid under pressure to a hydraulic actuator. The hydraulic fluid supply system according to the present invention is particularly suitable for supplying a controlled flow of a high pressure hydraulic fluid to power cylinders and servomotors of automotive power steering systems.

(2) Description of the Related Art

Modern automobiles are often provided with power steering systems to assist a driver when turning the steering wheel. The power steering system includes various types of hydraulic actuators, including a hydraulic power cylinder and hydraulic servomotor operatively connected with the steering linkage of the steering system. In allmost all instances, the hydraulic actuator is provided with a high-pressure hydraulic fluid by means of an engine-driven hydraulic pump such as a rotary vane pump.

Normally, the hydraulic pump used as a power source for the power steering system is a fixed displacement type, so that the output of the pump varies considerably in proportion to variations in the engine speed. Accordingly, for the power steering system to develop sufficient hydraulic power during engine idling, the pump must be designed to have a displacement capacity such that it will deliver a predetermined minimum output when the pump is running at minimum speed. This results in that the pump discharges an excessive amount of fluid at elevated engine speeds.

To counteract this excessive discharge, a flow control valve is usually provided between the pump and hydraulic actuator to control the flow rate of the hydraulic fluid at predetermined values regardless of the engine speed, and hence, the discharge rate of the pump.

Another requirement in the design of the power steering system is the provision of reduced hydraulic power during high speed cruising of the vehicle, to ensure the heavy steering required to counteract any abrupt steering action by the driver. This has been achieved by reducing the flow rate of the hydraulic fluid supplied to the power steering actuators at increased engine speeds. Such a reduction in the fluid supply rate at high engine speeds is known in the art as "drooping".

Another important requirement is to provide a power steering system operable at a minimum power consumption.

Japanese Unexamined Patent Publication (Kokai) No. 57-116910, published July 21, 1982, and entitled "Apparatus for supplying a high pressure hydraulic fluid", discloses a hydraulic fluid supply system provided with a "drooping" mechanism and capable of being operated at a reduced power during drooping. This publication discloses a fluid supply system comprising two independent pumps. The first pump is connected to a main passage having a fixed orifice and communicated with the power steering system, and a flow control valve having a variable orifice is positioned across the main passage. The second pump is connected to a subpassage which is selectively connected is response to the position of the flow control valve to a return passage or to the main passage. When the rotational speed of both pumps is increased, which, in turn, increases their output, the spool valve is moved to connect the subpassage with the return passage, thereby permitting the pressure fluid from the second pump to return to the reservoir by bypassing the power steering system. Thus, the power steering system is "drooped" when the pumps is running at a high speed, and the power consumption is correspondingly reduced.

The disadvantage of the system disclosed in the foregoing publication is that the rotational speed of the power pump and engine is not necessarily proportional to the vehicle speed. For example, the engine speed, and hence, the pump speed, varies considerably according to the position selected in the transmission system. Thus, under certain circumstances, the power pump and engine are operated at a low speed although the vehicle is running at a high speed. In this situation, the disclosed fluid supply system is not capable of achieving "drooping" and thereby reducing the power consumption.

SUMMARY OF THE INVENTION

The primary object of the present invention is to provide a hydraulic fluid supply system which may be electronically controlled according to various operating conditions of the vehicle, engine, and power steering system.

Another object of the present invention is to provide a hydraulic fluid supply system which is operated with a minimum energy consumption when in the "drooping" mode.

The hydraulic fluid supply system according to the present invention comprises a pumping mechanism including at least two independent pumping chambers adapted to deliver a high pressure fluid to a high pressure fluid supply conduit having therein a variable orifice and adapted to be connected to a hydraulic actuator. A first feed conduit is connected to one of the pumping chambers, e.g., the first pumping chamber, and a second feed conduit is provided for feeding intake fluid to the second pumping chamber. A flow control valve responsive to the pressure difference generated by the variable orifice is provided in the high pressure supply conduit to control the flow rate of the fluid flowing through the orifice. The system further comprises a switching valve and an electrically operable drive mechanism for the valve. When activated and deactivated, the drive mechanism operates switching valve to selectively connect the second feed conduit to the first feed conduit or to the high pressure supply conduit.

With this arrangement, the electrically operable drive may be actuated by an external control unit to shift the switching valve from a first position, in which the second conduit is connected to the first feed conduit, to a second position in which the second conduit is connected to the supply conduit. In this second position, a part of the high pressure fluid delivered by the pumping mechanism to the high pressure supply conduit is forced to flow back to the second pumping chamber, thereby reducing the flow rate of the high pressure fluid flowing into the hydraulic actuator of the power steering system, and thus enabling the supply system to operate in the "drooping" mode. Accordingly, the present invention provides a fluid supply system having a construction specifically adapted for electronic control. The supply system according to the invention may be changed to the "drooping" mode in response to any operating conditions of the vehicle, engine, and power steering system, including vehicle speed, pump speed, and the like.

Also, in the "drooping" mode of the system, the high pressure fluid pumped out by the pumping mechanism is allowed to flow into the second pumping chamber. This is particularly advantageous because the pumping work required at the second pumping chamber becomes negligible, thereby considerably reducing the overall power required to operate the pumping mechanism. In the system disclosed in the afore-mentioned prior art, the excessive high pressure fluid bypassing the hydraulic actuator in the "drooping" mode is returned to a low pressure fluid passage leading to the reservoir, and the second pump must pressurize the low pressure intake fluid to a high delivery pressure, thereby performing much the same pumping work as required in the usual non-drooping mode of operation. Thus, power saving is limited. In contrast, according to the present invention, the excessive high pressure fluid bypassing the actuator during the "drooping" mode is returned at a high pressure to the second pumping chamber without being admixed with the low pressure fluid flowing in the low pressure conduit communicated with the reservoir. Therefore, the second pumping chamber admits only the intake fluid pressurized at a high delivery pressure and discharges it at the same pressure, so that the pumping work thereof becomes substantially equal to zero and the energy consumption is considerably reduced.

Also, because the second pumping chamber admits the high pressure fluid during the drooping mode, the problem of cavitation is reduced.

Preferably, the switching valve includes a spring-biased slidable spool member movable between a high pressure chamber and a low pressure chamber at both ends thereof, and the electrically operable drive mechanism comprises a solenoid-operated cut-off valve adapted for ON/OFF control of the application of the low pressure to the low pressure chamber of the switching valve.

The switching valve may include a spool having opposite lands defining a circumferential groove therebetween, and the switching valve may include an inlet port and a pair of axially spaced first and second outlet ports. The outlet ports may be positioned in such a manner that the first outlet port is in permanent fluid communication with the groove and the second outlet port is selectively connected with the groove or the high pressure supply conduit.

Preferably, the variable orifice includes an orifice provided in the high pressure fluid supply conduit and a movable needle cooperating with the orifice, wherein the needle is integrally connected to the spool of the switching valve in such a manner that, upon movement of the spool of the switching valve, the needle is also moved to vary the cross-sectional flow area of the variable orifice.

The needle of the variable orifice may have a stepped configuration to produce sharp variations in the pressure difference thereacross, or have a tapered configuration to produce a gradual pressure difference variation.

These and other features and advantages of the present invention will be described in more detail below.

DESCRIPTION OF THE PREFERRED EMBODIMENTS

The present invention will be described in more detail with reference to the accompanying drawings.

Referring to FIGS. 1 through 4, there is shown the first embodiment of the invention. In this embodiment, the power pump is shown as being of the rotary vane pump having three pumping chambers. However, other type of power pump having a plurality of independent pumping chambers may be used. Also, the system may incorporate a plurality of independent hydraulic pumps, each having one or more pumping chambers.

In the illustrated embodiment, various components of the system, except for the cut-off valve and external fluid conduits, are incorporated into a unitary structure by way of a housing 1. In the housing 1, there are accommodated a rotary vane pump 200, a flow control valve 300, and a switching valve 400, the housing 1 serving as an outer shell or casing for the pump 200 and serving as valve cylinders for the valves 200 and 300.

Figure 1:
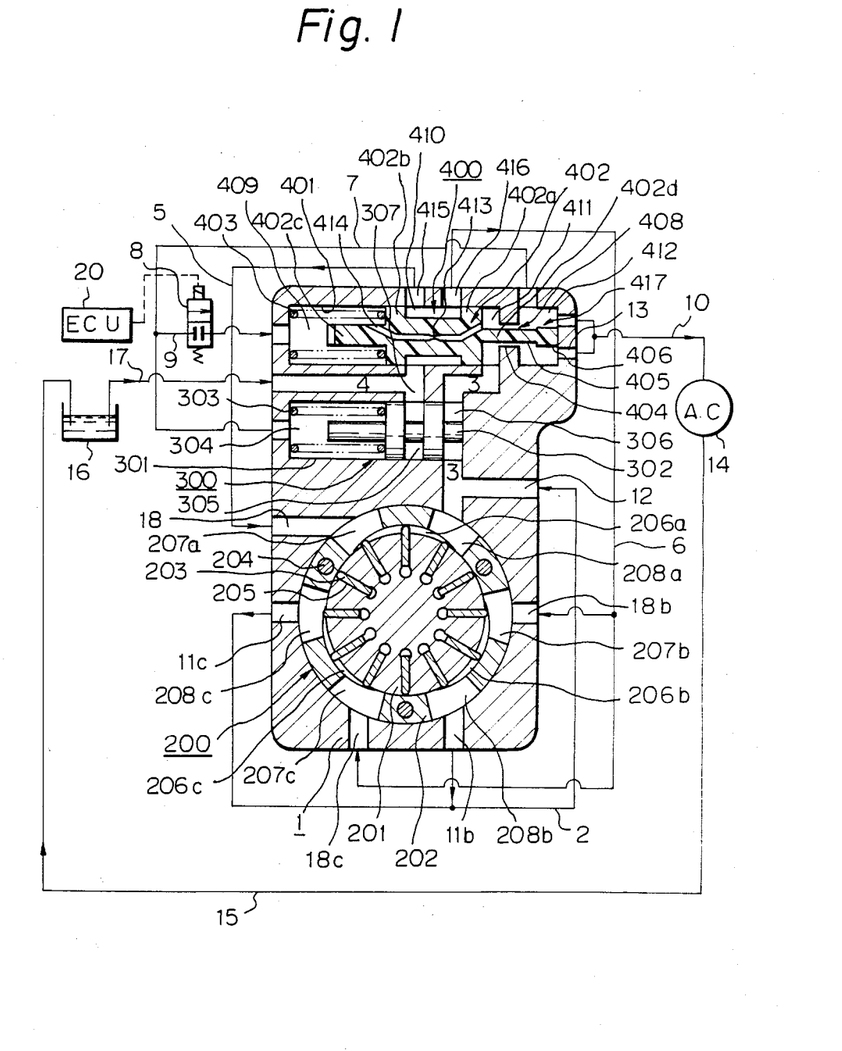
FIG. 1 is a cross-sectional view of the hydraulic fluid supply system according to the present invention and illustrates the flow control valve and switching valve, respectively, in their first non-operative position, and also shows the system operating in the first mode wherein the whole output from respective pumping chambers is forwarded to the hydraulic actuator.

The vane pump 200 includes a pump cylinder 202 received in a mating cavity in the housing 1 and having an inner bore having a cross-section in the shape of a rounded-off triangle. The cylinder 202 is located in the housing 1 by pins 204. The pump cylinder 202 receives a rotor 201 which is adapted to the driven by the automotive engine (not shown). The rotor 201 has a plurality of vane slots 205 in which respective vanes 203 are slidably fitted. The rotor 201 and cylinder 202 together define three independent pumping chambers; first chamber 206a, second chamber 206b, and third chamber 206c. The respective pumping chambers 206a, 206b, and 206c are communicated with inlet ports 207a, 207b, and 207c and delivery ports 208a, 208b and 208c formed in the pump cylinder 202. The first delivery port 208a communicates with a passage 3 internal to the housing 1, while the second and third delivery ports 208b and 208c are connected through passages 11b and 11c with a conduit 2 joined to the internal passage 3 through a passage 12. The internal passage 3 leads to a plurality of outlets 13 which are connected via a conduit 10 to the hydraulic actuator 14. The internal passages 3, 11 and 12 and external conduit 2 together form a high pressure fluid supply conduit. The hydraulic fluid from the actuator 14 is returned through a return conduit 15 to a fluid reservoir 16.

Intake fluid to the first pumping chamber 206a is fed from the reservoir 16 through a first feed conduit including a conduit 17, an internal passage 4, an external conduit 5, and an internal passage 18. Intake fluid to the second and third pumping chambers 206b and 206c is supplied through a second feed conduit including a conduit 6 and internal passages 18b and 18c.

When the fluid supply system is operating in the first mode illustrated in FIG. 1, that is, when the system is operating in neither the flow rate control mode nor the drooping mode, the deliveries from the second and third pumping chambers 206b and 206c are joined together in the conduit 2 and are further joined through the passage 12 to the passage 3 directly communicating with the first pumping chamber 206a. Therefore, the sum of the outputs of all the pumping chambers of the power pump is supplied to the actuator 14. In this mode, the conduit 6 of the second feed conduit is connected to the passage 4 of the first feed conduit, as described later, so that all the pumping chambers receive a low pressure fluid from the reservoir 16 to perform normal pumping action.

Figure 2:
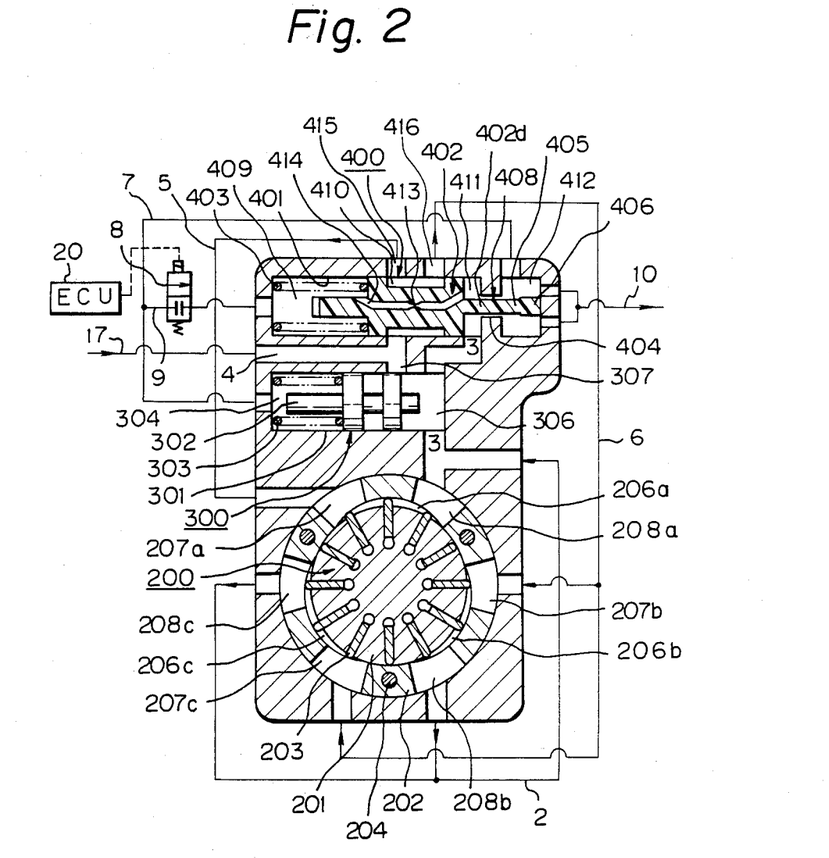
FIG. 2 is a view similar to FIG. 1, but showing the system operating in the second flow control mode, with the flow control valve shown in the operative position and the switching valve in the non-operative position.

The flow control valve 300 includes a spool 302 received slidably within a cylinder bore 301 formed in the housing 1. The spool 302 includes a central shaft and a pair of spaced lands integral with the shaft, and is biased by a spring 303 to the right as viewed in FIG. 1 until the right-hand end of the shaft, forming a stopper, abuts against the side of the bore 301. The interior of the bore 301 is divided by the spool 302 into a low pressure chamber 304, an intermediate space 305, and a high pressure chamber 306. The low pressure chamber 304 is connected through a line 7 with the passage 3 downstream of a variable orifice 408, described later, to reflect therein the pressure drop generated by the variable orifice 408. The high pressure chamber 306 forms part of the passage 3 and is subjected to the high pressure of the fluid pressurized by the pump 200. Thus, the spool 302 of the flow control valve 300 moves in response to the pressure difference across the variable orifice 408 to bring the high pressure chamber 306 into and out of communication with an outlet port 307 opened into the passage 4 and to control the flow rate of the fluid flowing through the passage 3 in such a manner that the pressure difference across the orifice 408 is maintained at a predetermined level. In FIG. 1, the spool 302 is shown in its reset position, while FIG. 2 shows the position of the spool when shifted. The excessive fluid is released through the outlet port 307 toward the low pressure passage 4.

Figure 3:
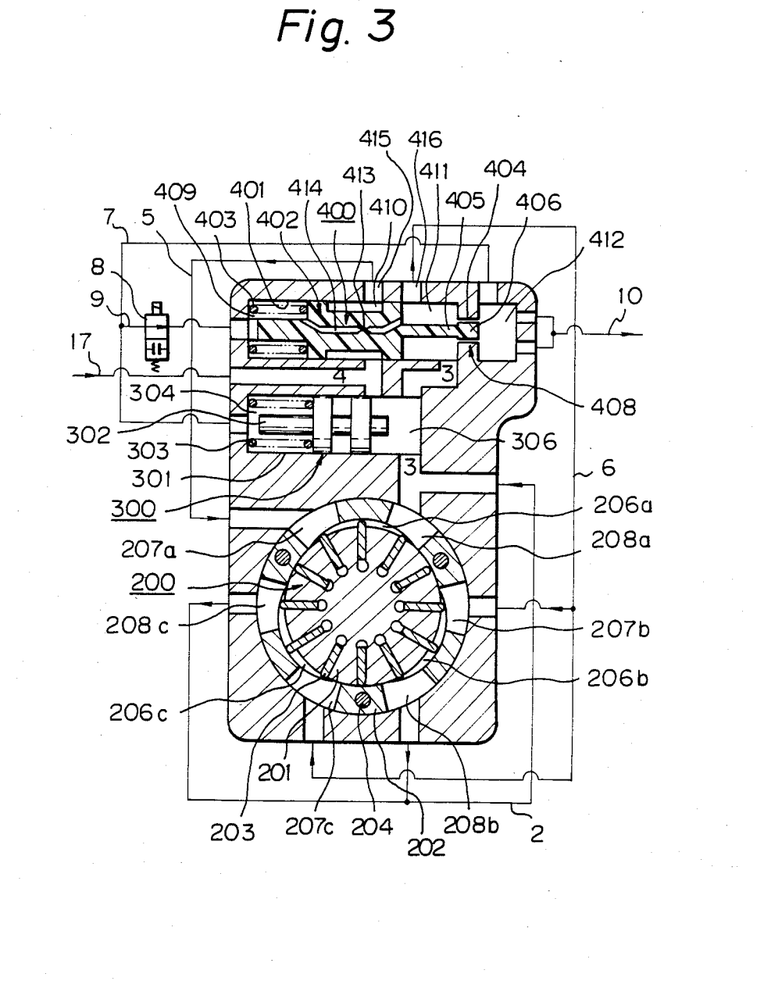
FIG. 3 is a view similar to FIG. 1, but illustrating the system operating in the third "drooping" mode, with the flow control valve and switching valve shown in their operative position and the variable orifice shifted to the second position.

The switching valve 400 includes a valve cylinder bore 401 formed in the housing 1. A spool 402 is slidably received in the bore 401 and is biased by a spring 403 to the right as viewed in FIG. 1. The spool 402 includes a pair of spaced lands 402a and 402b and opposite shaft portions 402c and 402d, the right hand shaft portion 402d being integral with a needle of the variable orifice 408. The spool 402 is provided between the spaced lands 402a and 402b with an annular groove 410 forming part of the second feed conduit. The size of the groove 410 is such that it is in permanent fluid communication with the passage 4 regardless of the position of the spool 402. The switching valve 400 has an outlet port 415 connected to the conduit 5 of the first feed conduit. The valve 400 is also provided with a second outlet port 416 axially spaced from the first outlet port 415 and connected to the conduit 7 of the second feed conduit. The outlet ports 415 and 416 are located in such a manner that when the spool 402 is in the first inoperative position shown in FIGS. 1 and 2, the groove 410 is in fluid communication with both outlet ports 415 and 416, and when the spool 403 is shifted to the second operative position as shown in FIG. 3, the groove 410 is connected solely with the first outlet port 415 and the second outlet port 416 is connected to the passage 3.

At both ends of the spool 402 and inside the cylinder bore 401, there are defined a low pressure chamber 409 and a high pressure chamber 411. The high pressure chamber 411 forms part of the internal high pressure passage 3. The low pressure chamber 409 is connected through a low pressure line 9 and the line 7 with the portion 412 of the passage 3 downstream of the variable orifice 408, in such a manner that the reduced fluid pressure in the passage portion 412 is reflected in the chamber 409. Transmission of the reduced pressure into the low pressure chamber 409 is ON/OFF controlled by a solenoid-operated normally-closed cut-off valve 8 placed in the conduit 9. The cut-off valve 8 may be operated by an electronic control unit 20 including a programmed digital computer which signals the cut-off valve 8 based on various operating conditions such as vehicle speed, delivery pressure of the pump 200, steering angle, steering speed and the like. When the control unit 20 signals the valve 8 to open, the reduced pressure in the passage portion 412 downstream of the variable orifice 408 is admitted to the low pressure chamber 409 so that, under the high pressure in the chamber 411, the spool 402 moves to the left against the action of the spring 403 into the second operative position shown in FIG. 3. When the solenoid valve 8 is closed, the pressures in both chambers 409 and 411 are equilibrated through a passage 414 having a restriction 413 so that the spool is held in the first inoperative position under the spring force, as shown in FIGS. 1 and 2. The flow area of the restriction 413 is selected to be smaller than the flow area of the conduits 7 and 9 so that an adequate pressure difference is developed at both ends of the spooll 402 when the valve 8 is opened.

The variable orifice 408 includes an orifice or aperture 404 formed in the high pressure passage 3 and coaxial with the valve cylinder bore 401. The variable orifice 408 further includes a needle 417 which is integrally connected to or an integral part of the shaft portion 402d of the spool 402. In the illustrated embodiment, the needle 417 has a stepped cylinderical configuration providing a small diameter portion 405 and an enlarged diameter portion 406. Alternatively, the needle 417 may be tapered so that the diameter increases gradually toward its outer end.

Modes of operation of the fluid supply system will be described below. Throughout various operational modes, the pump rotor 201 is rotated in synchronization with the engine crankshaft (not shown) and the respective pumping chambers 206a, 206b and 206c of the pump 200 cyclically draw the intake fluid through respective inlets 207a, 207b, and 207c and discharge pressurized fluid through outlets 208a, 208b and 208c. The high pressure fluid from the three pumping chambers is brought together in the internal passage 3 and is supplied to the actuator 14 at a controlled flow rate.

Figure 4:
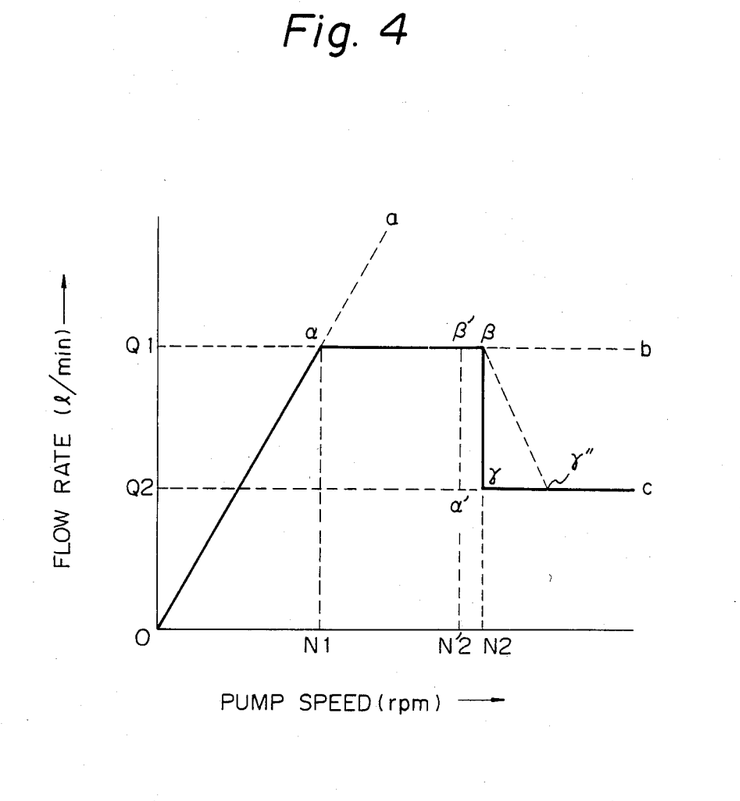
FIG. 4 is a graph showing the variations in the discharge rate of the system in response to the speed of the pump.

When the rotational speed of the pump rotor 201 is less than a predetermined value $N_1$, and hence the discharge rate of the pump 200 is less than $Q_1$, the system operates in the first mode shown in FIG. 1. In this mode, the cut-off valve 8 is deenergized so that the spool of the switching valve 400 is in the first or rest position and the variable orifice is in its first position with a larger clearance being formed between the aperture 404 and small diameter needle portion 405. The spool 302 of the flow control valve 300 remains in the rest position as shown because the return spring 303 is preloaded sufficient to withstand the pressure difference developed across the variable orifice 408 at the flow rate of less than $Q_1$ and reflected on both sides of the spool 302. Thus, the whole of the hydraulic fluid delivered from the pump 200 is fed through the passage 3 to the actuator 14. Consequently, the flow rate Q of the fluid supplied to the actuator 14 is proportional to the rotational speed N of the pump rotor 201. This is shown in FIG. 4 by the inclined solid line extending along the dotted line a.

As the pump speed reaches $N_1$ and the flow rate of the fluid flowing through the orifice 408 becomes equal to $Q_1$, the system operates in the second or flow rate control mode. The pressure difference existing between the chambers 304 and 306 due to the pressure difference acorss the variable orifice 408 overcomes the preloaded spring force of the spring 303, thereby causing the spool 302 to give way to the left as shown in FIG. 2 so that the outlet port 307 of the valve 300 is opened to release a part of the high pressure fluid in the chamber 306 to the low pressure passage 4. As the speed of the pump 200 increases further, the spool 302 moves further in response to the increasing pressure difference generated across the variable orifice 408. Thus, the flow control valve 300 controls the flow rate of the fluid flowing through the orifice 408 in such a manner that the pressure difference developed across the orifice 408 is kept at a constant level. As a result, as long as the cross-sectional flow area of the variable orifice 408 remains unchanged, the flow control valve 300 serves to control the flow rate through the orifice 408 at a predetermined value $Q_1$. This is illustrated in the graph of FIG. 4 by the horizontal solid line extending along the dotted line b. The purpose of providing the actuator 14 with hydraulic fluid at a constant flow rate is to ensure that the steering wheel must be turned by a constant manual turning effort. The excessive high pressure fluid is returned through the outlet 307 to the low pressure passage 4 and is mixed with the fluid from the reservoir 16 to be drawn into the three pumping chambers. Thus, in this mode, all the pumping chambers are performing a normal pumping action in the sense that they intake a low pressure fluid and discharge it at a high pressure.

Under certain operating conditions wherein the power steering system must be supplied with a reduced amount of hydraulic fluid, the fluid supply system is operated in the third, so-called "drooping" mode. The important features of the present invention are that the third mode can be electronically initiated and controlled in response to various operating factors, and that in this third mode the effective displacement capacity of the pump is reduced to operate the pump in a power-saving manner. The "drooping" mode may be triggered by the electronic control unit 20 which may be designed to determine the condition in which the power steering system must be drooped based on a data base including the vehicle speed, speed of the pump, pump output, steering angle, steering speed and the like, and to energize the solenoid valve 8. For example, drooping may be effected when the vehicle is running above a predetermined high speed or the pump is operating at more than a predetermined speed $N_2$.

In the third mode, when the solenoid valve 8 is opened, the reduced fluid pressure in the passage portion 412 is reflected within the low pressure chamber 409 of the switching valve 400, while the high pressure chamber 411 is subjected to the high delivery pressure of the pump 200. As the flow area of conduits 7 and 9 is larger than the flow area of the restriction 413 in the passage 414, an adequate pressure difference is produced on both sides of the spool 402, causing the spool to move against the action of the spring 403 to the second extreme position as shown in FIG. 3. In this position, the fluid in the reservoir 16 is fed through the passage 4, groove 410 of the spool 402, conduit 5, passage 18, and inlet port 207a to the first pumping chamber 206a which pressurizes the low pressure fluid to a high pressure and discharges it toward the outlet port 208a. On the other hand, the second outlet port 416 of the switching valve 400 is switched away from the groove 410 and is connected to the high pressure chamber 411 so that the second conduit 6 is communicated with the high pressure passage 3. As a result, a part of the high pressure fluid discharged from the three pumping chambers of the pump 200 into the passage 3 is fed through the conduit 6 to the second and third pumping chambers 206b and 206c. This produces two different effects. First, a part of the high pressure fluid flowing through the passage 3 is caused to bypass the variable orifice 408 and actuator 14, thereby reducing the flow rate of the fluid flowing through the orifice 408 toward the actuator 14 to provide a drooping effect. Second, this permits the second and third pumping chambers to draw the intake fluid at a high pressure and deliver it at the same pressure so that the effective pumping work of these two pumping chambers becomes substantially zero. Thus, the energy required to operate the pump 200 is substantially equal to the power necessary for the work of only the first pumping chamber 206a. In this manner, the second and third pumping chambers 206b and 206c are practically disabled and the pump 200 as a whole is operated as if the discharge capacity thereof is reduced, although actually the pump is constantly delivering the same output. In the illustrated embodiment wherein the power pump 200 is provided with three pumping chambers, the energy consumption in the third mode is reduced to about one third. It will be noted that by designing the size of the first pumping chamber 206 to be smaller than that of the second and third pumping chambers, it is possible to promote the power saving during the drooping mode.

An additional advantage provided by the second and third pumping chambers 206b and 206c operating to admit the high pressure fluid is that it is possible to avoid the problem of cavitation which would be otherwise caused during the suction stroke of the pumping chambers due to gaseous components in the intake fluid being liberated in the form of bubbles under decompression within the pumping chambers. Thus, the present invention contributes to prevention of premature damage to the components of the pump because of cavitation.

In the third "drooping" mode, reduction of the flow rate of fluid flowing through the variable orifice 408 will correspondingly cause a reduction in the pressure difference across the orifice 408 required to operate the flow control valve 300. This is compensated by varying the cross-sectional flow area of the variable orifice 408.

That is, simultaneously with the movement of the spool 402 from its first to second positions, the needle 417 integral therewith is moved accordingly from its first to second positions, whereby the larger diameter portion 406 is brought into cooperation with the aperture 404 thereby limiting the cross-sectional flow area of the orifice 408. This causes the pressure difference across the orifice 408 to become greater than the pressure difference created in the first position of the variable orifice 408, so that the spool 302 of the flow control valve 300 is moved further to the left as shown in FIG. 3 as compared to the position shown in FIG. 2. The spool 302 thus operates in response to the increased pressure difference across the orifice 408 in such a manner that it controls the flow rate at a reduced value $Q_2$ smaller than the value $Q_1$. This is shown in FIG. 4 by the solid line extending along the dotted line c. In this manner, the fluid supply system is operated in the drooping mode as well as in the energy saving mode. It will be appreciated that the third mode may be selected by signalling the solenoid valve 8. Thus, the system is electronically controllable.

As shown in FIG. 4, the drooping mode may be commenced at the pump speed $N_2$ to reduce the flow rate $Q_1$ at the point $\beta$ to the flow rate $Q_2$ at the point $\Delta$. Alternatively, the drooping mode may be initiated at a predetermined vehicle speed corresponding, for example, to a pump speed $N'_2$, to reduce the flow rate $Q_1$ at the point $\beta'$ to $Q_2$ at the point $\alpha'$. In this instance, the threshold vehicle speed may be selected to impart an improved steering feel to the driver.

In the illustrated embodiment, the needle 417 of the variable orifice 408 is stepped to suddenly increase the pressure drop and reduce the flow rate. However, the needle 417 may be tapered so that the flow rate is gradually reduced from $Q_1$ at the point $\beta$ to $Q_2$ at the point $\gamma''$ as shown by the dotted line in FIG. 4.

Figure 5:
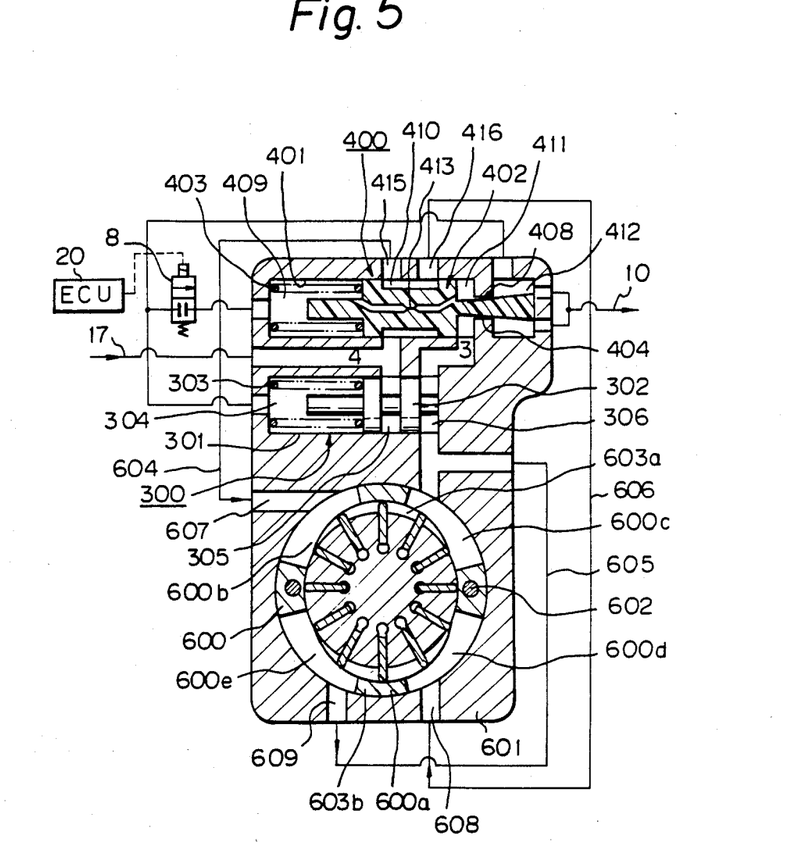
FIG. 5 is a cross-sectional view of a second embodiment of the present invention.

In FIG. 5, there is shown a second embodiment of the invention. Parts and members similar to those of the first embodiment are designated by like reference numerals and will not be described again. In the first embodiment, the pump cylinder has a cylinder bore with a rounded-off triangle cross-section to define three pumping chambers. In the second embodiment shown in FIG. 5, the pump cylinder 600 is provided with a cylinder bore 600a having an oval configuration. The pump cylinder 600 is accommodated within the housing 601 and held in position by pins 602. Due to the oval shape of the bore 600a, two independent pumping chambers 603a and 603b are defined between the cylinder and the rotor. The first pumping chamber 603a intakes the low pressure fluid through a feed conduit 604, a passage 607 in the housing 601, and a first inlet port 600b, and discharges the high pressure fluid through a first outlet port 600c into the high pressure passage 3. The second pumping chamber 603b draws the intake fluid through a second conduit 606, a passage 608, and an second inlet port 600d and delivers the pressurized fluid through a second outlet port 600e a passage 609, and a conduit 605 to the high pressure passage 3. The first conduit 604 is constantly connected through the annular groove 410 of the spool 402 to the low pressure passage 4, while the second conduit 606 is selectively connected to the low pressure passage 4 or high pressure passage 3 in response to the position of the switching valve 400. By energizing or deenergizing the solenoid valve 8, this embodiment operates in substantially the same manner as in the first embodiment thereby producing similar advantages in the drooping mode.

Although the present invention has been described herein with reference to the specific embodiments thereof, it should be noted that the present invention is not limited thereby and various changes and modifications may be made therein without departing from the scope of the invention. For example, in the foregoing embodiments, the spool valve 402 of the switching valve 400 is described and illustrated as being actuated by the pressure difference generated by the variable orifice and controlled by the solenoid valve 8. However, the spool 402 may be designed to be directly operated by any other suitable electromagnetic drives in response to external electrical signals.

We claim:

1. A hydraulic fluid supply system for supplying a controlled amount of hydraulic fluid under pressure to a hydraulic actuator, which comprises:
 (a) pumping means, including a plurality of independent pumping chambers, for delivery of high-pressure hydraulic fluid, said pumping chambers including at least a first and a second pumping chambers;
 (b) a high-pressure fluid supply circuit having a first end in fluid receptive relationship with said pumping chambers and a second end in fluid transmitting relationship with said hydraulic actuator;
 (c) a first feed conduit for feeding a low-pressure fluid to said first pumping chamber;
 (d) a second feed conduit in fluid communication with said second pumping chamber;
 (e) a variable orifice provided in said supply conduit for generating variable pressure differences across said orifice, said variable orifice being operable between a first position providing a predetermined cross-sectional flow area and a second position in which the flow area thereof is reduced;
 (f) a flow control valve positioned in said supply conduit upstream of said variable orifice and responsive to the pressure difference developed across said orifice to control the flow rate of the high-pressure fluid flowing therethrough at constant values depending on the pressure difference;
 (g) a switching valve for selectively connecting said second feed conduit to said first feed conduit or to said supply conduit, said switching valve having a first position in which said second feed conduit is communicated with said first feed conduit for feeding the low-pressure fluid to said second pumping chamber and a second position in which said second feed conduit is communicated with said supply conduit for feeding the high-pressure fluid to said second pumping chamber, said switching valve being operatively interconnected with said variable orifice in such a manner that on movement of said switching valve from said first position to said second position thereof said variable orifice moves from the first position thereof to the second position;
 (h) electrically operable drive means for shifting said switching valve from said first position to said second position thereof together with said variable orifice, thereby connecting said second feed conduit to said high-pressure supply conduit and reducing the cross-sectional flow area of said variable orifice, whereby a part of the high-pressure fluid pumped out by the first and second pumping chambers is returned back to said second pumping chamber by bypassing the hydraulic actuator thereby disabling said second pumping chamber to reduce the effective overall displacement of said pumping means, said flow control valve operating at the second position of said variable orifice to control the fluid flowing through said orifice toward the actuator to flow at reduced flow rates.

2. A hydraulic fluid supply system according to claim 1, wherein said switching valve comprises a body having a cylinder bore and a slidable spool received movably within said bore, said spool defining at the ends thereof in said bore a high-pressure chamber forming part of said fluid supply conduit and a low-pressure chamber communicated through a low-pressure conduit with a source of relatively low-pressure fluid, said high-pressure chamber being in permanent communication with said low-pressure chamber through a passage having a restriction, said spool being spring biased toward said first position, and wherein said electrically operable drive means comprises a solenoid-operated cut-off valve operable to control the application of the low-pressure fluid into said low-pressure chamber.

3. A hydraulic fluid supply system according to claim 2, wherein said low-pressure conduit is connected to the fluid supply conduit downstream of said variable orifice so as to transmit to said low-pressure chamber the reduced fluid pressure due to a pressure drop across said orifice.

4. A hydraulic fluid supply system according to claim 2, wherein said spool of said switching valve comprises opposite lands defining a circumferential groove therebetween, said switching valve comprising an inlet port and axially spaced first and second outlet ports, said inlet port and first outlet port forming part of said first feed conduit and being so positioned as to be in fluid communication with said circumferential groove for all positions of the spool, said second outlet port being positioned such that it is communicated with said groove in the first position of said switching valve and is communicated with said high-pressure supply conduit in the second position of said switching valve.

5. A hydraulic fluid supply system according to claim 1, wherein the displacement of said first pumping chamber is smaller than that of said second pumping chamber.

6. A hydraulic fluid supply system according to claim 1, wherein said pumping means comprises at least three pumping chambers adapted to deliver high-pressure fluid to said supply conduit, one of said pumping chambers being in fluid receptive communication with said first feed conduit, the remainder of said pumping chambers being in fluid receptive communication with said second feed conduit.

7. A hydraulic fluid supply system according to claim 1, wherein said switching valve comprises a slidable spool and wherein said variable orifice comprises an aperture and a cooperating movable needle, said aperture being formed in said fluid supply conduit and having a predetermined cross-sectional area, said needle being axially aligned with said spool of the switching valve and integrally connected thereto for movement therewith, said needle being so shaped that on movement of said slidable spool from said first position to said second position, the clearance between the orifice and the needle is reduced.

8. A hydraulic fluid supply system according to claim 7, wherein said needle has a stepped cylindrical configuration having a small diameter portion located adjacent to said spool and an enlarged diameter portion located remote from said spool.

9. A hydraulic fluid supply system according to claim 7, wherein said needle is tapered so that the clearance between the aperture and the needle is gradually reduced as said needle is moved from said first position to said second position.

* * * * *